United States Patent [19]
Liu et al.

[11] Patent Number: 5,792,547
[45] Date of Patent: *Aug. 11, 1998

[54] LOW NOISE MAGNETIC HEAD FOR HIGH FREQUENCY RECORDING

[75] Inventors: Francis H. Liu; Minshen Tan, both of Fremont; Hua-Ching Tong, San Jose, all of Calif.

[73] Assignee: Read-Rite Corporation, Milpitas, Calif.

[*] Notice: The term of this patent shall not extend beyond the expiration date of Pat. No. 5,612,098.

[21] Appl. No.: 607,130

[22] Filed: Feb. 26, 1996

[51] Int. Cl.⁶ .................................................. G11B 5/127
[52] U.S. Cl. .................. 428/212; 428/693; 428/900; 427/128; 427/131; 360/113; 360/126
[58] Field of Search ..................... 428/693, 212, 428/900; 427/128, 131; 360/113, 126

[56] References Cited

U.S. PATENT DOCUMENTS 5,465,185  11/1995  Heim et al. ........................ 360/113
5,612,098   3/1997  Tan et al. .......................... 427/529

*Primary Examiner*—Stevan A. Resan
*Attorney, Agent, or Firm*—Nathan N. Kallman

[57] ABSTRACT

A laminated pole structure for use in a low noise magnetic head suitable for high frequency signal operation is formed by interleaving a plurality of ferromagnetic layers and electrically insulating antiferromagnetic layers so as to form interface surfaces therebetween. External magnetic fields are applied as the interface surfaces are being formed for establishing exchange anisotropies with predetermined permanent exchange pinning directions in the ferromagnetic layers. The exchange anisotropies may be in the same or opposite directions, as defined by the external magnetic fields. In one embodiment, the pole structure has an open edge lamination, while in another embodiment the pole structure has a closed edge lamination. In still another embodiment, the antiferromagnetic layers include predetermined patterns of nonmagnetic material.

14 Claims, 6 Drawing Sheets

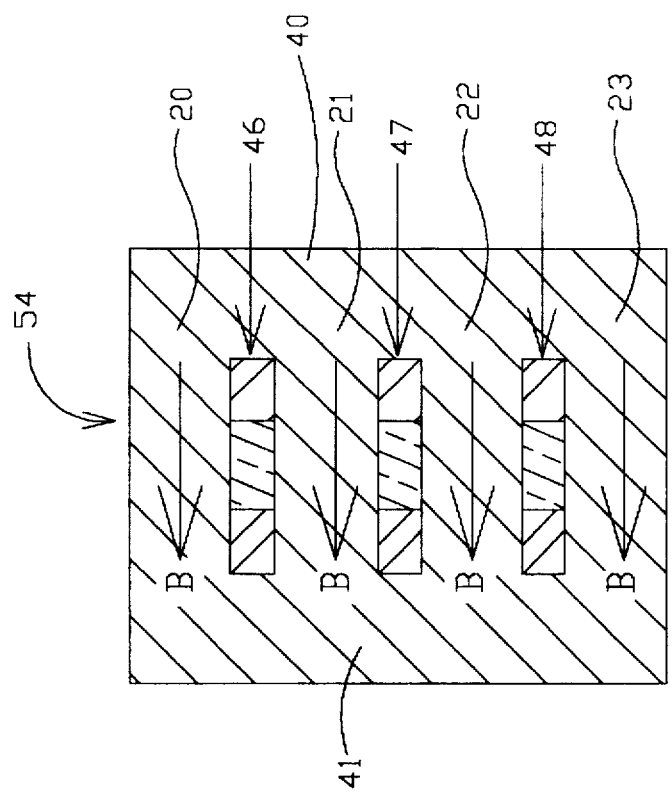
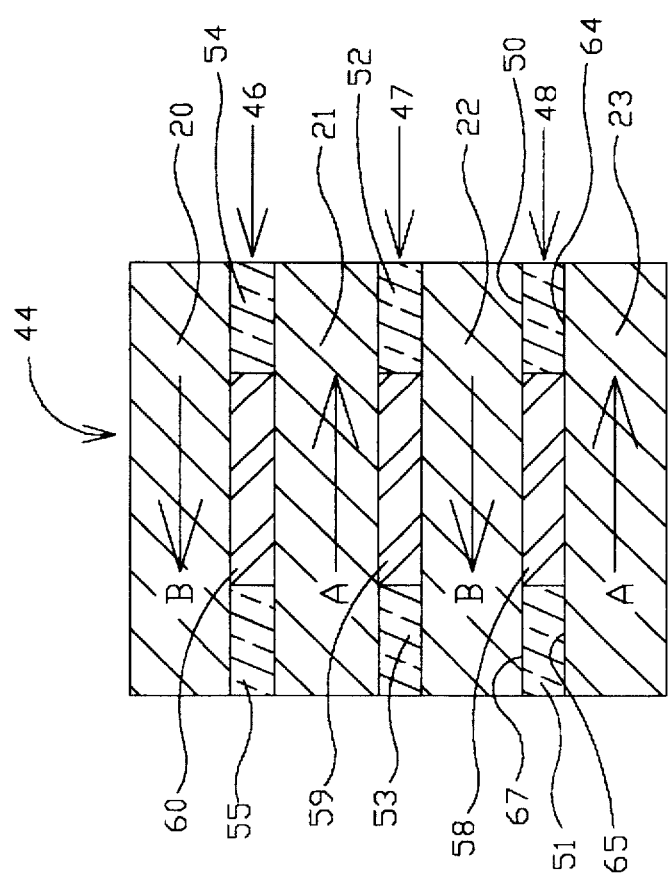

LOW NOISE MAGNETIC HEAD FOR HIGH FREQUENCY RECORDING

FIELD OF THE INVENTION

This invention relates to magnetic recording heads, and in particular to high frequency, low noise, thin film magnetic transducers employing high permeability magnetic films for magnetic pole structures and magnetic shields, or other thin films.

DESCRIPTION OF THE PRIOR ART

Thin film magnetic recording devices of small physical size show the effect of individual magnetic domains. When a magnetic field is applied to a thin magnetic film, particularly at a relatively high frequency, the effective permeability of the magnetic material starts decreasing until it reaches an ineffective low value. This phenomenon is generally referred to as frequency roll-off. Since permeability is a measure of the performance of the recording device, it would be highly desirable to optimize its high frequency response by maximizing its permeability over a wide frequency range.

During the reading operation, a magnetic pole structure of thin film magnetic heads serves as a flux guide which links the signal flux emanating from a magnetic record medium with a head coil. In order to accommodate signal flux variations, the pole magnetization must change accordingly. In multi-domain poles, these magnetization changes occur in the form of spin rotation and domain wall motion. The domain wall motion is only partially reversible, while the associated small irreversible jumps in the wall position produce abrupt voltage transient spikes in the flux. These voltage transient spikes are referred to as Barkhausen noise.

One approach to overcome the problem of frequency roll-off, is described in U.S. Pat. Nos. 5,331,728, 5,032,945 and 5,388,019 to Argyle et al. These patents describe the use of a magnetic thin film structure comprised of a spacer of nonmagnetic material that is interposed between two layers of magnetic material. An edge closure layer of magnetic material is disposed on a side edge of the spacer, and is in magnetic contact with the two layers of magnetic material. The spacer interrupts the flow of the eddy current, and minimizes frequency roll-off. The edge closure layer eliminates edge closure domains and magnetic edge-curling walls in order to reduce Barkhausen noise. One particular structure described in the referenced patents enables the use of unidirectional exchange anisotropy to reduce Barkhausen noise by utilizing conductive antiferromagnetic material, such as FeMn. However, conductive antiferromagnetic material cannot be used as insulating lamination to minimize frequency roll-off.

A specific component of Barkhausen noise causes an undesirable instability of the head directly after termination of a write operation, resulting from voltage transient spikes that are caused by a delayed relaxation after the write operation. Such instability is referred to as "noise-after-write" or "popcorn noise". A solution to the popcorn noise problem is proposed in U.S. Pat. No. 5,236,735 to Yoshida et al., wherein a thin film magnetic head is produced by annealing the head at high temperatures.

Another component of Barkhausen noise is amplitude covariance or readback nonrepeatability, which is defined as the standard variation of the readback signal over its mean value. It is a desirable goal in magnetic head designs to minimize this amplitude covariance. A proposed solution is described in U.S. Pat. No. 5,385,637 to Thayamballi, which is assigned to the same assignee as the present application. This patent discloses a method for reducing readback non-repeatability by depositing a layer of antiferromagnetic material, such as FeMn, locally in the upper magnetic pole to create large uniaxial anisotropy.

In another approach disclosed in U.S. Pat. No. 4,103,315 to Hempstead et al., the domain walls are minimized by a multiple thin film structure including at least one pair of layers of a ferromagnetic material and antiferromagnetic material deposited one over the other that are exchange coupled to retain a unidirectional bias in the plane of the ferromagnetic material. A third nonmagnetic material is needed for bidirectional exchange anisotropy in adjacent pairs of ferromagnetic and antiferromagnetic layers.

However, none of the foregoing prior art has successfully and simultaneously improved the high frequency response of the magnetic head by reducing frequency roll-off behavior, popcorn noise, and amplitude covariance.

SUMMARY OF THE INVENTION

The present invention is directed to a low noise, laminated magnetic thin film pole structure for use in a magnetic head. The laminations include interleaved layers of ferromagnetic (FeM) material and electrically insulating antiferromagnetic (AFe) material. The pole structure which is produced has extended high frequency response, high performance and minimal eddy current. As a result, the areal density and in particular the linear density of the recorded data is increased.

In addition, the present invention enables the use of a single insulating AFe layer for pinning or exchange coupling with both adjacent FeM layers, in either the same or opposite directions, in contrast to the use of a third nonmagnetic layer needed for exchange coupling with both adjacent FeM layers, as described in U.S. Pat. No. 4,103,315. Bias fields are applied during the deposition of the FeM and insulating AFe layers and the interface layers are formed between the FeM and insulating AFe layers.

The foregoing and other objects and features of the present invention are realized by use of a laminated pole structure in a low noise magnetic head. The pole structure is formed by interleaving a plurality of FeM layers and insulating AFe layers with interface layers formed therebetween. External magnetic fields are applied as the interface layers are being formed for establishing uniaxial anisotropies with predetermined permanent exchange pinning directions in the FeM layers. The exchange anisotropies may be in the same or opposite direction as defined by the external magnetic fields.

In one embodiment, the pole structure has an open edge lamination, while in another embodiment, the pole structure has a closed edge lamination. In still another embodiment, the AFe layers include predetermined patterns of nonmagnetic material.

BRIEF DESCRIPTION OF THE DRAWING

The invention will be described in greater detail with reference to the drawing in which:

FIG. 7 is an enlarged cross-sectional view of the pole structure of FIG. 1 along line 2—2, showing patterned AFe layers;

FIG. 8 is an enlarged cross-sectional view of the pole structure of FIG. 4 along line 5—5, showing patterned antiferromagnetic layers.

Similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1:
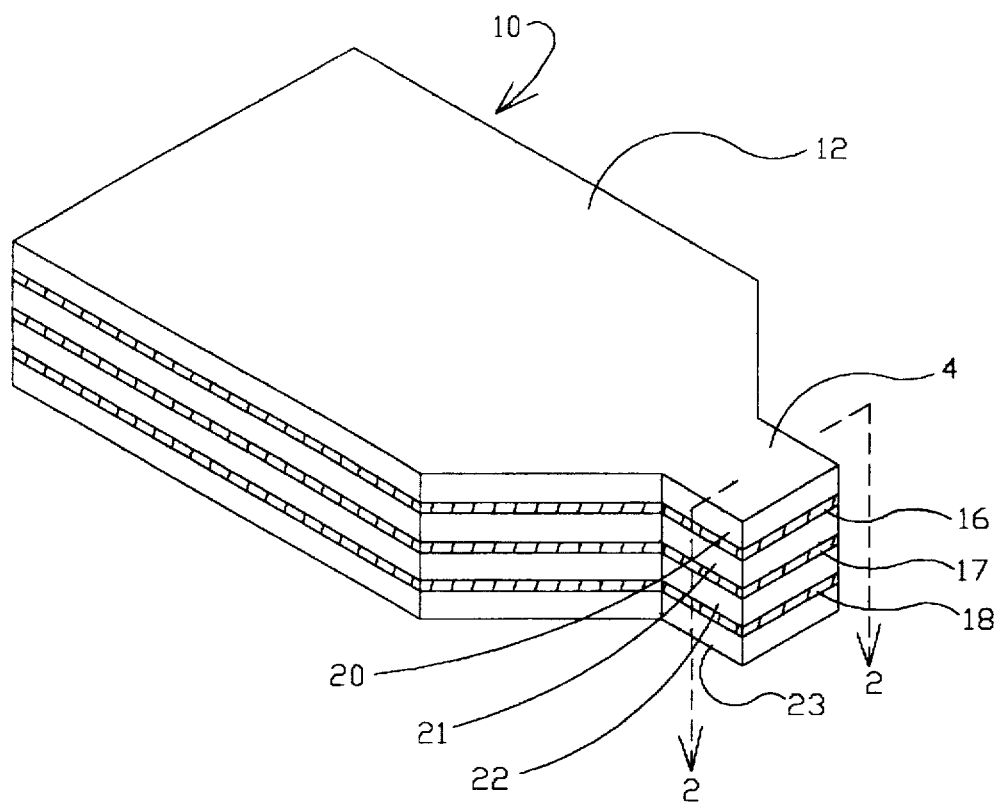
FIG. 1 is an isometric view of a thin film pole structure including an open edge lamination, made in accordance with this invention.

FIG. 1 shows a laminated thin film magnetic pole structure 10 according to a one embodiment of the present invention, which is adapted for use as one of a pair of pole layers in a magnetic head for writing and reading magnetic signals onto and from a magnetic recording medium respectively. It should be understood that the thin film magnetic pole layer is supported on a substrate (not shown), as is well known in the art. The pole layer 10 includes a yoke portion 12. The pole tip 14 of the pole layer 10 and the pole tip of the other pole layer define a transducing gap. The pole layer 10 comprises a plurality of insulating AFe layers 16, 17, 18 that are interleaved with a plurality of FeM layers 20, 21, 22, 23 in a sandwich type configuration. The insulating AFe layers 16, 17, 18 extend continuously across substantially the entire surface area of the FeM layers 20, 21, 22, 23. In this particular embodiment, the pole structure 10 is configured with an open edge lamination.

The insulating AFe layers 16–18 are made of NiCo—O. However, other insulating AFe materials or composites may alternatively be used, such as NiO and $Fe_2O_3$. The FeM layers 20–23 are made of NiFe, but other FeM materials or composites with high saturation magnetization may be used. Examples of such alternative ferromagnetic materials include FeN, FeAlN, FeTaN, CoFeB, CoNiFe, CoZrNb, CoZrHf and CoZrTa.

The present configuration of the pole structure 10 serves a dual purpose, namely eddy current reduction and domain stabilization. The insulating AFe layers 16–18 serve as electrical barriers between the FeM layers 20–23, and thus reduce the eddy current in the yoke 12 during high frequency applications. Consequently, the permeability of the FeM layers 20–23 does not roll off significantly at high frequencies, thus extending the frequency range and improving the performance of the magnetic head.

The insulating AFe layers 16–18 also provide exchange coupling to the yoke 12, thereby reducing magnetic instabilities during readback. The domain stabilization feature will further be described along with the fabrication process of the pole structure 10 in conjunction with FIG. 2. The FeM layer 23 is deposited on a substrate (not shown).

Next, as the insulating AFe layer 18 is deposited atop the FeM layer 23, and an interface surface 24 is being formed therebetween, a bias field, i.e., an external magnetic field, is applied in the direction of arrow A, parallel to the surface of the FeM layer 23.

As the FeM layer 22 is deposited on the insulating AFe layer 18, and an interface surface 25 is being formed, an external magnetic field is applied in the direction of the arrow B, parallel to the surface of the insulating AFe layer 18. This external magnetic field establishes a uniaxial anisotropy, and defines a permanent exchange pinning direction in the FeM layer 22.

Figure 2:
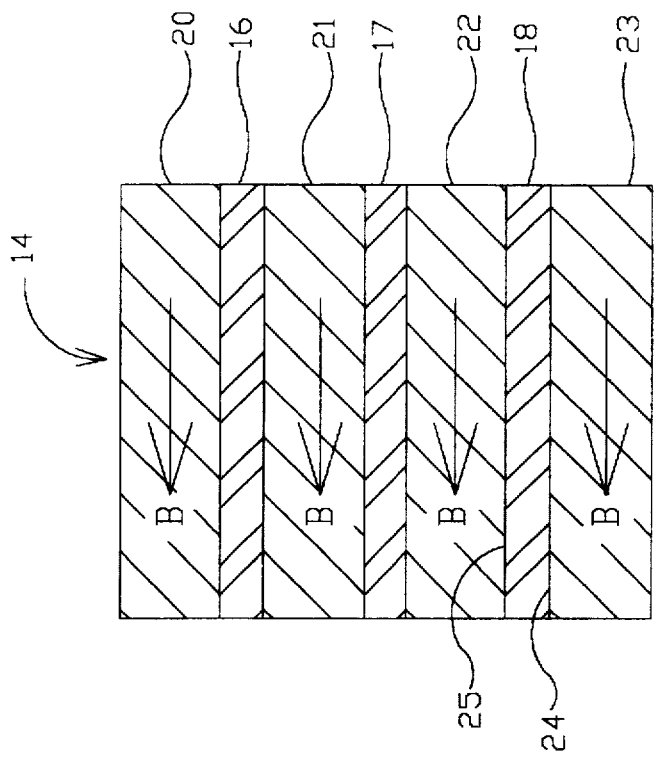
FIG. 2 is an enlarged cross-sectional view of the pole structure of FIG. 1 along line 2—2, illustrating bidirectional exchange anisotropy in successive FeM layers.

The remaining FeM layers 20, 21, and AFe layers 16, 17, are formed similarly to the FeM layers 22, 23 and insulating AFe layer 18, to define the desired unidirectional exchange anisotropies in the FeM layers 20, 21, as illustrated in FIG. 2. While a specific number of layers, i.e., seven, is shown for illustration, it should be understood that a different number of FeM and insulating AFe layers in sandwich type configurations can also be used for different types of magnetic heads and in different applications.

In this particular embodiment, and as shown by the arrows B and A, the exchange anisotropies in two adjacent FeM layers, 22, 23, are in opposite directions. One of the distinctive features of the present invention is the ability to define these opposite directions using a single insulating AFe layer. This feature is needed to minimize the magnetostatic energy in adjacent layers. Since each FeM layer has a single domain state, the magnetic flux is conducted therein purely by rotation, thus substantially reducing Barkhausen noise, and in particular popcorn noise and amplitude covariance.

Preferably, the thickness of the FeM layers 20–23 range between ½ micron to 1 micron, and the thickness of the insulating AFe layers 16–18 are between 100 Angstroms and 500 Angstroms.

Figure 3:
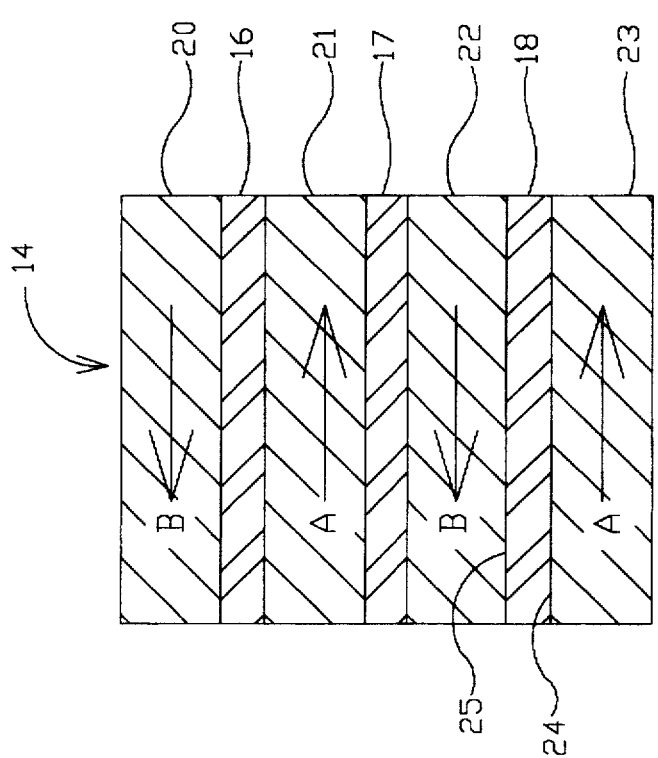
FIG. 3 is an enlarged cross-sectional view of the pole structure of FIG. 1 along line 2—2, illustrating unidirectional exchange anisotropy in successive FeM layers.

FIG. 3 shows a variation in the design of the pole structure 10, and illustrates the formation of a unidirectional exchange anisotropy in the successive FeM layers 20–23. While the exchange anisotropy direction may be that of the arrow B, it should be clear that the opposite direction may alternatively be selected. As explained above in relation to FIG. 2, the exchange anisotropy direction is set during the formation stages of the interface surfaces 24, 25, between the adjacent FeM and insulating AFe layers.

Figure 4:
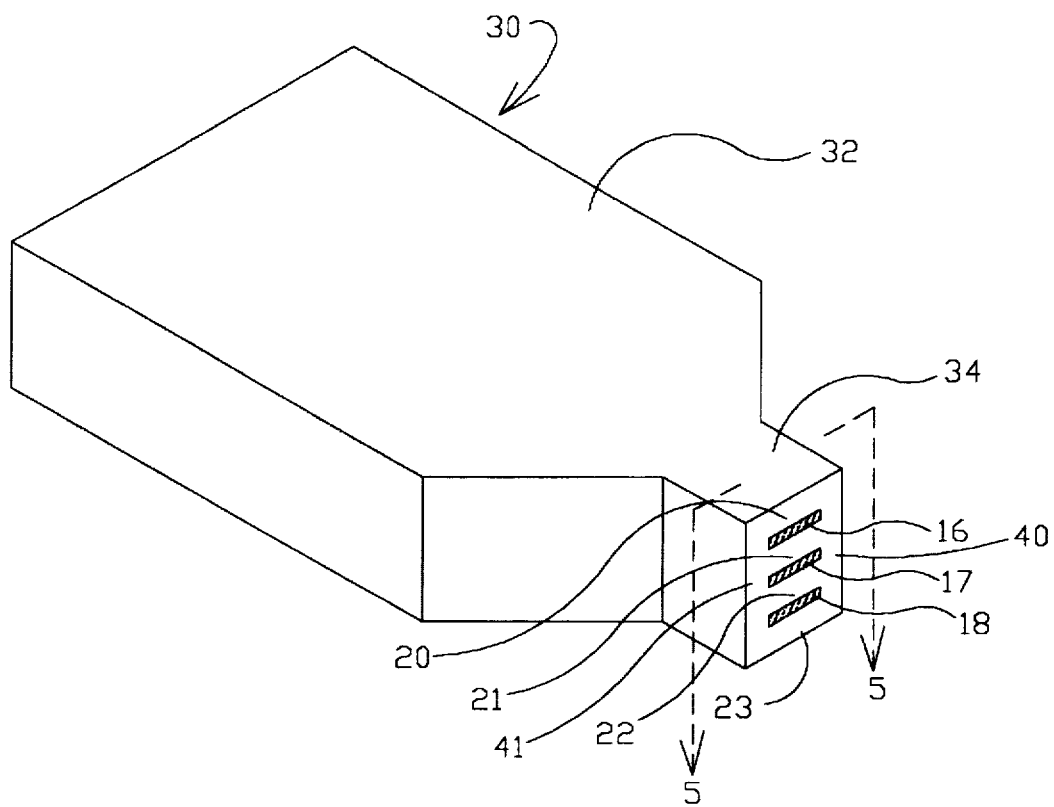
FIG. 4 is an isometric view of another thin film pole structure according to the present invention, including a closed edge lamination for use in a magnetic head.

FIG. 4 illustrates another pole structure 30 with a closed edge lamination, according to the present invention. The pole structure 30 is generally similar to the pole structure 10, with similar reference numerals referring to the same or similar elements. The pole structure 30 generally includes a yoke 32, a tip 34, and two edge closure layers 40, 41 disposed on opposed side edges of the yoke 32, and at opposed side edges of the tip 34. The edge closure layers 40, 41 are comprised of magnetic material and are in magnetic contact with the FeM layers 20–23 to provide a closed magnetic flux loop.

Figure 5:
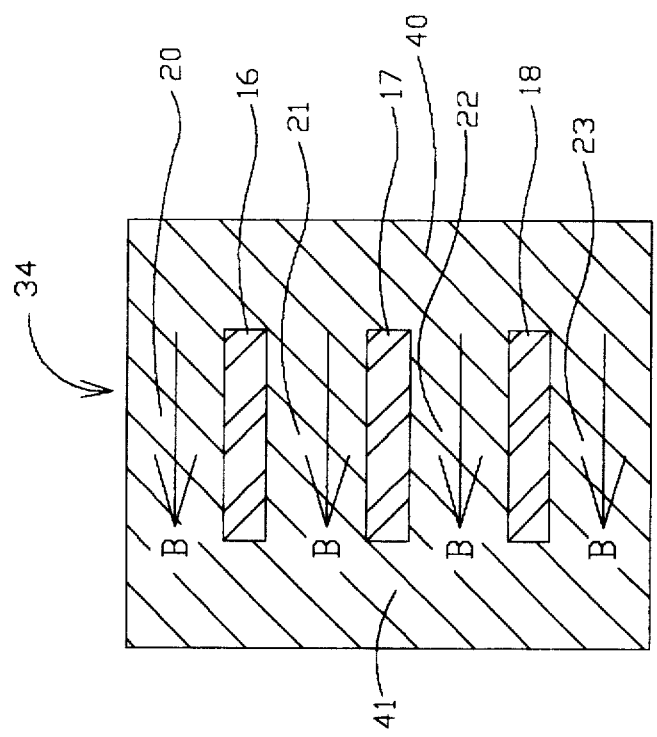
FIG. 5 is an enlarged cross-sectional view of the pole structure of FIG. 4 along line 5—5, illustrating bidirectional exchange anisotropy in successive FeM layers.
Figure 6:
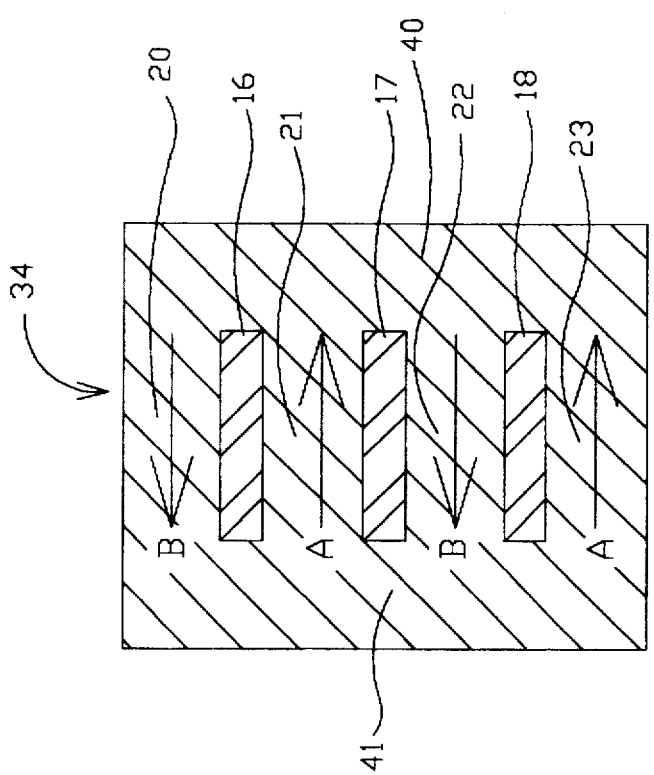
FIG. 6 is an enlarged cross-sectional view of the pole structure of FIG. 4 along line 5—5, illustrating unidirectional exchange anisotropy in successive FeM layers.

FIGS. 5 and 6 show two cross-sectional views of the tip 34, respectively showing the bidirectional and unidirectional exchange anisotropies in the successive FeM layers 20–23. The fabrication process of the pole structure 34 is similar to that of the pole structure 10. The edge closure layers 40, 41 are nonanisotropic, and are formed lithographically, or by other known techniques.

FIG. 7 illustrates another variation of the pole structure in accordance with the present invention. In this embodiment, the pole structure 10 has an open edge lamination, and includes a tip 44 and a yoke (not shown), with a similar configuration to that of the tip 14 and the yoke 12. The configuration variation causes increase in head sensitivity during readback, resulting from the compensation for the exchange pinning field strength.

For this purpose, the tip 44 and the yoke are laminated with successive layers of FeM layers 20–23, and alternating insulating AFe layers 46, 47, 48 in a sandwich type arrangement, as explained above in connection with the pole structure 10 of FIG. 1. However, in this particular alternative embodiment, the insulating AFe layers 46–48 are patterned with patterns 50, 51, 52, 53, 54, 55 of insulating AFe material, as described above, and patterns 58, 59, 60 of nonmagnetic material, such as $Al_2O_3$.

In this alternative embodiment, exchange pinning of the FeM layers 20–23 is selectively patterned, so that unidirectional exchange anisotropy occurs in regions of the FeM layers 20–23 adjacent to the patterns 50–55 of insulating AFe material, while exchange pinning is blocked in those regions of the FeM layers 20–23 adjacent to the patterns 58–60 of nonmagnetic material.

The fabrication process of the pole structure 10 will now be described in conjunction with FIG. 7. The FeM layer 23 is deposited on a substrate. Next, a layer of nonmagnetic material is formed continuously across substantially the entire surface area of the FeM layer 23. This nonmagnetic layer is then etched away and patterned, as desired, to form the pattern 58. For instance the pattern 58 may have the shape of a elongated strip, a rectangle, or any other desired shape. In the example shown in FIG. 7, the edges of the nonmagnetic layer are etched away to form the pattern 58.

Subsequently, as the insulating AFe patterns 50, 51 are deposited in those etched away patterns atop the FeM layer 23, and interface surfaces 64, 65 are being formed therebetween, an external magnetic field is applied in the direction of the arrow A, parallel to the surface of the FeM layer 23. As explained above, the external magnetic field establishes a uniaxial anisotropy, and defines a permanent exchange pinning direction in the FeM layer 23.

As the FeM layer 22 is deposited on the insulating AFeM layer 48, and an interface surface 67 is being formed, an external magnetic field is applied in the direction of the arrow B, parallel to the surface of the insulating AFe layer 48. This external magnetic field establishes a uniaxial anisotropy, and defines a permanent exchange pinning direction in the FeM layer 22, in the regions adjacent to the patterns 50, 51.

The remaining FeM layers 20, 21 and insulating AFe layers 46, 47 are then formed similarly to the FeM layers 22, 23 and insulating AFM layer 48, to define the desired unidirectional exchange anisotropies in selected regions of the FeM layers 20, 21. While the present example describes the insulating AFe layers 48 as having one nonmagnetic pattern 67, it should be understood that each of these insulating AFe layers 46–48 may include a different number of nonmagnetic patterns. Also selective unidirectional exchange anisotropy may be established by combining the pole structure design illustrated in FIG. 7 within the design of the pole structure 10 (FIG. 3).

FIG. 8 shows another pole structure 54 with a closed edge lamination, according to the present invention. The pole structure 54 basically combines the pole structure design illustrated in FIG. 7 within the design of the pole structure 30 (FIG. 2). It illustrates unidirectional exchange anisotropy in FeM layers 20–23. It should be understood that bidirectional exchange anisotropy may also be established by combining the pole structure design illustrated in FIG. 7 within the design of the pole structure 30 (FIG. 5).

Figure 9:
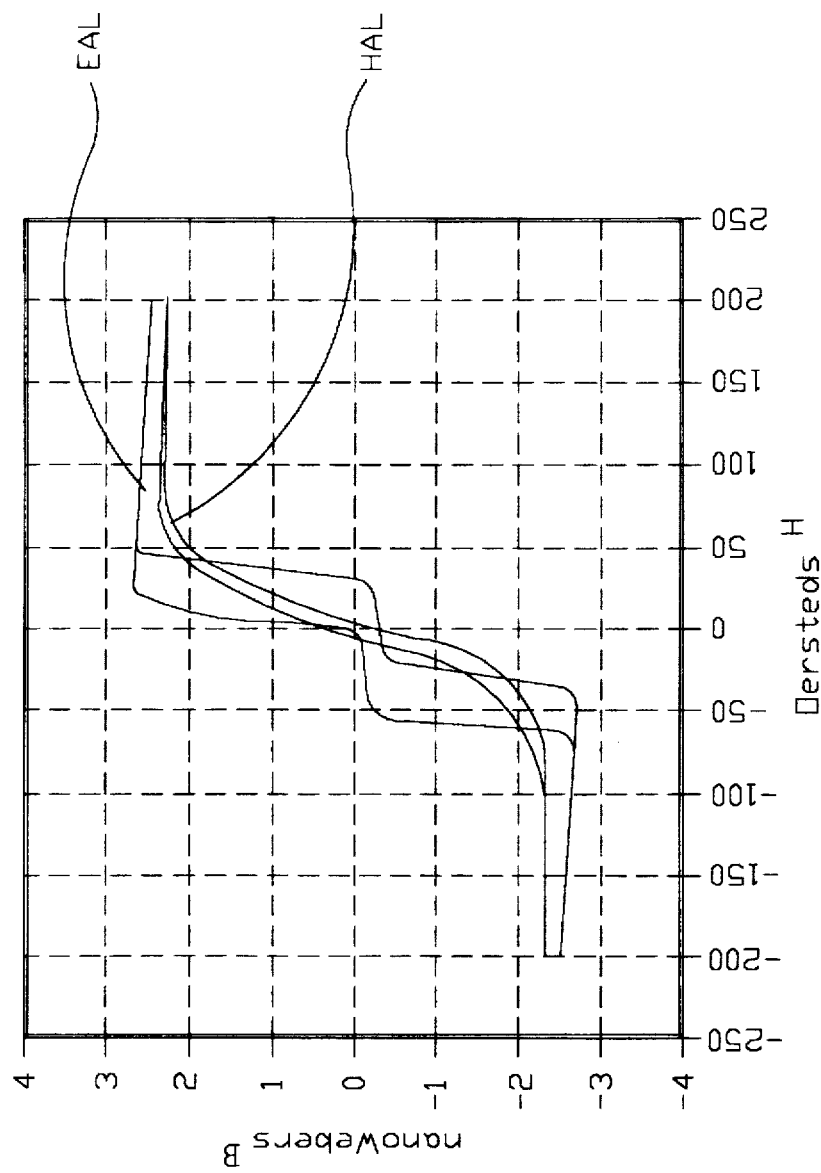
FIG. 9 represents an easy-axis loop and a hard-axis loop of a flux B through one of the pole structures of FIGS. 1 through 8 versus an externally applied bias field H.

FIG. 9 represents an easy-axis loop (EAL) and a hard-axis loop (HAL) of the flux B through one of the pole structures of FIGS. 1 through 8, versus an externally applied field H. The EAL and HAL plots confirm the development of bidirectional exchange anisotropies. The EAL also indicates that effective exchange coupling is obtained at the interface surfaces 24, 25 (FIG. 2) and 65, 67 (FIG. 7).

It should be understood that the invention is not limited to the specific parameters, materials and embodiments described above. Various modifications may be made within the scope of the present invention. For instance, the present invention may be embodied in yoke-type magnetoresistive (MR) and giant magnetoresistive (GMR) heads, shields for MR and GMR heads, transformers, and other thin film magnetic transducers.

What is claimed is:

1. A method of forming a laminated pole structure for use in a magnetic head comprising the steps of:

depositing a first ferromagnetic layer on a substrate;

depositing an electrically insulating antiferromagnetic layer directly on substantially the entire surface of said first ferromagnetic layer whereby an interface surface is formed between said first ferromagnetic layer and said electrically insulating antiferromagnetic layer;

applying a first bias field, as said interface surface is being formed, for establishing a uniaxial anisotropy with a first permanent exchange pinning direction in said first ferromagnetic layer;

depositing a second ferromagnetic layer directly on substantially the entire surface of said electrically insulating antiferromagnetic layer to form a second interface surface between said electrically insulating antiferromagnetic layer and said other ferromagnetic layer; and applying a second bias field, as said second interface surface is being formed for establishing a uniaxial anisotropy with a second permanent exchange pinning direction in said other ferromagnetic layer.

2. The method of claim 1, wherein said steps of applying said first and second bias fields include establishing unidirectional uniaxial anisotropies with the same first and second permanent exchange pinning directions.

3. The method of claim 1, wherein said steps of applying said first and second external bias fields include establishing bidirectional uniaxial anisotropies with opposite first and second permanent exchange pinning directions.

4. The method of claim 1, further including the steps of forming sandwiches of alternating ferromagnetic and electrically insulating antiferromagnetic layers in addition to said first and second ferromagnetic layers and said electrically insulating antiferromagnetic layer.

5. The method of claim 4, further including the step of forming a closed edge lamination by depositing two edge closure layers on opposed side edges of said ferromagnetic and electrically insulating antiferromagnetic layers.

6. The method of claim 4, wherein said steps of depositing electrically insulating antiferromagnetic layers include the steps of patterning said electrically insulating antiferromagnetic layers with preselected patterns of nonmagnetic material.

7. A laminated pole structure for use in a magnetic head comprising:

a first ferromagnetic layer;

an electrically insulating antiferromagnetic layer deposited directly on substantially the entire surface of said first ferromagnetic layer whereby an interface surface is formed between said first ferromagnetic layer and said electrically insulating antiferromagnetic layer and a uniaxial anisotropy with a first permanent exchange pinning direction is established in said first ferromagnetic layer; and a second ferromagnetic layer deposited directly on substantially the entire surface of said electrically insulating antiferromagnetic layer, whereby a second interface surface is formed between said electrically insulating antiferromagnetic layer and said second ferromagnetic layer, and a uniaxial anisotropy with a second permanent exchange pinning direction is established in said second ferromagnetic layer.

8. The laminated pole structure of claim 7, wherein said anisotropies are unidirectional or bidirectional.

9. The laminated pole structure of claim 8, including at least one additional sandwich of alternating electrically insulating antiferromagnetic and ferromagnetic layers deposited over said second ferromagnetic layer.

10. The laminated pole structure of claim 9, further including two edge closure layers on opposed side edges of said ferromagnetic and electrically insulating antiferromagnetic layers to form a closed edge lamination.

11. The laminated pole structure of claim 9, wherein said ferromagnetic layers are made of NiFe, FeN, FeAlN, FeTaN, or CoFeB, CoNiFe, CoZrNb, CoZrHf or CoZrTa.

12. The laminated pole structure of claim 9, wherein said electrically insulating antiferromagnetic layers are made of NiCo—O, Ni—O or $Fe_2O_3$.

13. The laminated pole structure of claim 9, wherein said electrically insulating antiferromagnetic layers include predefined patterns of nonmagnetic material.

14. The laminated pole structure of claim 13, wherein said patterns of nonmagnetic materials are made of $Al_2O_3$.

* * * * *